July 2, 1968     D. W. BERREMAN     3,390,934

CONVECTION TYPE GASEOUS LENS

Filed July 28, 1964

INVENTOR
D. W. BERREMAN
BY
H. O. Wright
ATTORNEY

United States Patent Office 3,390,934
Patented July 2, 1968

3,390,934
CONVECTION TYPE GASEOUS LENS
Dwight W. Berreman, Westfield, N.J., assignor to Bell Telephone Laboratories, Incorporated, New York, N.Y., a corporation of New York
Filed July 28, 1964, Ser. No. 385,739
4 Claims. (Cl. 350—179)

ABSTRACT OF THE DISCLOSURE

This application discloses a gas lens in which convection effects are utilized to produce a gas flow. In accordance with the invention, a chimney portion is located at the center of a heated tube. As the gas within the tube is heated, it tends to rise within the chimney portion and, thereby, causes the gas to flow through the tube. Heating of the outer region of the flowing gas simultaneously produces a radial variation in the refractive index of the gas. This has a focusing effect upon electromagnetic wave energy propagating through the tube.

---

This invention relates to the long distance transmission of a beam of ultrahigh frequency electromagnetic wave energy through an enclosing conduit. More particularly, it relates to improved arrangements for subjecting the beam to focusing effects during transmission to substantially eliminate beam spreading and scattering of the rays of the beam.

This application is related to the following copending applications, all assigned to applicant's assignee, disclosing and claiming numerous and varied other arrangements directed to substantially the same or similar objects, as for the present application. The copending applications are D. W. Berreman, Ser. No. 347,166, filed Feb. 25, 1964; D. W. Berreman, Ser. No. 353,689, filed Mar. 23, 1964; K. B. McAfee, Jr., Ser. No. 357,424, filed Apr. 6, 1964; D. W. Berreman-S. E. Miller, Ser. No. 379,175, filed June 30, 1964; A. C. Beck-G. E. Conklin-A. R. Hutson, Ser. No. 379,112, filed June 30, 1964; and E. A. J. Marcatili, Ser. No. 382,873, filed July 15, 1964.

In my above-mentioned copending joint application with S. E. Miller, it is proposed that a laminar flow of transparent gas be maintained by a blower or the like through a heated tube enclosed in a larger conduit and arranged to permit the passage of a laser beam or the like along its axis. The beam will then be subjected to a focusing effect since the laminas of the gas nearer the inner surface of the tube will be raised to higher temperatures than laminas nearer the axis of the tube and the radially varying temperature gradient will establish a similar gradient with respect to the reciprocals of the respective refractive indices of the gas laminas.

In order to avoid the necessity of maintaining a flow of transparent gas through the tube by a blower or the like, it is proposed in the present application that advantage be taken of the phenomenon of convection.

Accordingly, an upwardly extending chimney portion is provided near the center of the heated tube and convection currents are thereby established which maintain a localized circulation of the transparent gas into each end of the tube through the tube to the chimney portion, and from the upper end of the chimney portion back to the ends of the tube, the gas temperature being suitably reduced in the paths followed between the upper end of the chimney portion and the ends of the tube.

It is therefore a principal object of the invention to simplify focusing arrangements for use in long distance ultrahigh frequency electromagnetic wave beam transmission systems.

Other and further features, objects and advantages of the invention will become apparent from a perusal of the following detailed description of specific illustrative embodiments of the invention and the appended claims taken in conjunction with the accompanying drawing, in which:

Figure 1:
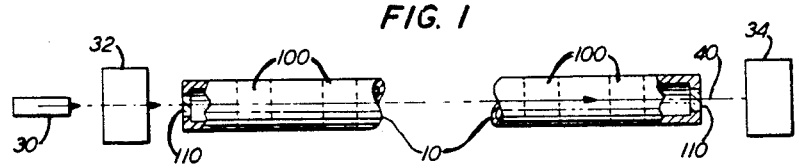
FIG. 1 illustrates in diagrammatic form a system of the type in which the focusing devices of the invention are intended to be employed.

In more detail in FIG. 1, a conduit 102 which should be impervious to gases and preferably also impervious to ultrahigh frequency electromagnetic wave energy extends between two terminal stations designated station A and station B. Typically, these terminal stations will be in or near widely separated cities, such as New York and Chicago, respectively. Intermediate stations (not shown) at which amplification and branching of communication channels, as desired, may be effected and conduit gas pressure, et cetera, may be monitored and corrected will be distributed at appropriate intervals along the conduit substantially as for conventional long distance communication systems.

A plurality of focusing devices 100, one specific form of which is illustrated in and will be described in detail in connection with FIG. 2 hereinunder, are distributed at appropriate intervals within and along conduit 102, a typical spacing between consecutive devices 100 being, for example, in the order of one to ten feet, being less where the conduit is less nearly straight and more where it is more nearly straight. Devices 100 each provide a transparent linear or slowly turning path therethrough for a laser beam or the like and all of devices 100 are aligned so that the beam path 40 passes without obstruction through them all. Where it is necessary to negotiate pronounced curvatures of the conduit, the outer sides of the curved portions of the tube and/or conduit may be heated more than the inner sides to produce a prismatic effect as taught in the first of my above-mentioned copending applications.

At station A on the left a laser 30 generates an ultrahigh frequency electromagnetic wave beam and directs it through modulator 32 and window 110 at the left end of conduit 102 along beam path 40. Modulator 32 impresses information signals, such as speech, video, data, or the like, on the beam, which then traverses path 40 to station B at the far (right) end of the conduit where utilization or receiving apparatus 34 receives and demodulates the beam, emerging from window 110 at the right end of conduit 102, to recover the signals impressed thereon. Focusing devices 100 serve to concentrate the beam along path 40 and thus to prevent spreading or scattering of its rays, with consequent attenuation and/or interference effects. Windows 110 may be of thin, high quality optical glass having plane parallel major surfaces and function to confine the gas with which conduit 102 is filled as will be further discussed hereinunder. Alternatively, they may in addition be thin lenses forming part of terminal optical systems for suitably injecting the beam into the conduit and projecting the beam to the receiving apparatus 34, respectively.

Figure 2:
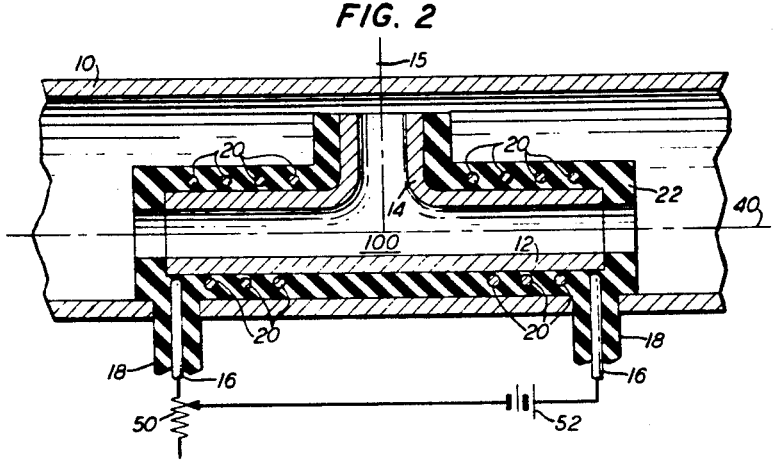
FIG. 2 illustrates diagrammatically, and in a longitudinal cross-sectional showing, a first form of focusing device of the invention.

Turning now to FIG. 2, there is illustrated in longitudinal cross section a portion of conduit 10 enclosing a first specific form of focusing device 100 of the invention.

Conduit 10 is filled with a transparent gas such as carbon dioxide, clean air, or the like. (See the above-mentioned copending McAfee application for a number of other gases.) Means for conditioning the gas and regulating its pressure and temperature, such as filters, compressors, heating and/or cooling means, all of conventional forms, though not shown, are normally included in systems of the type contemplated, as is well known to those skilled in the art.

Device 100 comprises a horizontal tube 12 of a good heat conducting material, such as copper, or aluminum, or the like, having a longitudinal path along its axis of ample cross-sectional dimensions to permit a laser beam, or the like, to pass along path 40 without obstruction.

Midway along tube 12 an upwardly extending chimney section, tube 14, which may be of the same material as tube 12, intersects and opens into tube 12.

A heating coil 20 is wound around the outer surface of tube 12 and leads 16 having heat insulating coverings 18 are brought out of conduit 10. A rheostat 50 is connected in series with coil 20 and energy source 52 to afford control of the temperature of tube 12, in conventional manner. The degree of focusing is substantially proportional to the difference in temperature between the tube 12 and the gas in conduit 10. It is incidentally also approximately proportional to the pressure of the gas in conduit 10.

Tubes 12 and 14 and coil 20 are encased in a heavy coating 22 of heat insulating material to eliminate any appreciable radiation of heat from the outer surfaces of these members. Such radiation would obviously delay the cooling of the hot gas emerging from the upper end of chimney member 14 and would waste power. As illustrated, the insulating coating 22 preferably extends a short distance beyond the ends of tube 12.

The upper or open end of chimney member 14 and its insulation have appreciable clearance from the adjacent inner surface of conduit 10 so that the gas, filling the conduit 10, enters both ends of tube 12, becomes heated and rises through chimney member 14 from which it discharges back into conduit 10. Conduit 10 will during operation of the device 100 normally be at a temperature substantially below that of tube 12 so that the gas emerging from chimney member 14 is quickly cooled to substantially its temperature upon entering tube 12. Conventional cooling means, not shown, may of course be readily devised to further reduce the temperature of conduit 10 if found desirable. Accordingly, it is apparent that localized convection currents causing gas from conduit 10 to flow smoothly into both ends of tube 12 and thence to chimney portion 14 will be established. Since the outer laminas of this smooth flow of gas will be at higher temperatures than laminas nearer the longitudinal axis of tube 12, a radially varying refractive index gradient decreasing from the axis to the inner surface of tube 12 will be established and a focusing effect (convergent) will be exerted on a laser beam, or the like, transmitted along path 40.

In some systems, the use of an outer or over-all enclosing conduit, such as conduit 10 of FIGS. 1 and 2, may not be deemed warranted. In such systems a form of focusing arrangement such as that illustrated in FIG. 3 may be employed.

Figure 3:
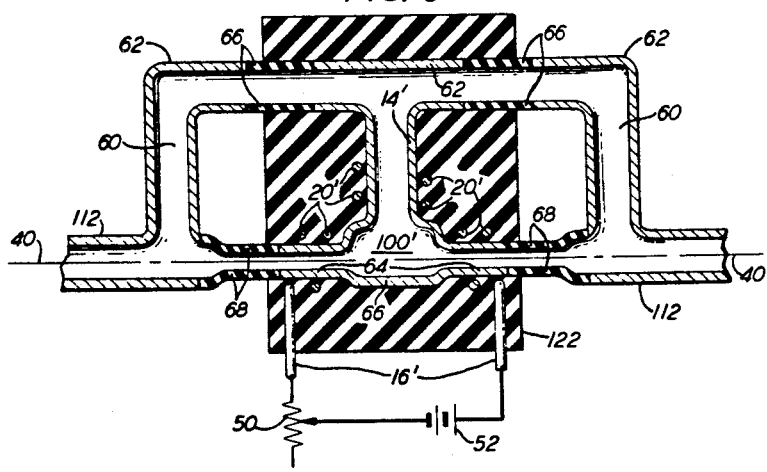
FIG. 3 illustrates diagrammatically, and in longitudinal cross section, a second form of focusing device of the invention.

In FIG. 3 a relatively small diameter tube 112 is employed as the interstation conduit. A chimney portion 14' (similar to 14 of FIG. 2) is connected to a central portion 66 comprising a bulge from the upper side of which portion 14' extends upwardly. Two portions 64 of somewhat smaller diameter than that of tube 112 extend horizontally in opposite directions from bulge 66 to join left and right portions of conduit 112 as shown. The moderately constrictive effect of the smaller portions 64 tends to accentuate the focusing action of the gas therethrough. Sections 68 of a material which does not conduct heat, as for example, asbestos, are interposed to link portions 64 with conduit 112 and arms 60 to prevent conduction of heat along conduit 112 and arms 60.

A heating coil 20' surrounds portions 64 and the lower end of portion 14' and is furnished with power from source 52 through rheostat 50.

A horizontal tube 62 serves to conduct gas issuing from the upper end of chimney 14' to both the left and the right where downwardly extending tubes 60 serve to reintroduce the gas from chimney portion 14' to conduit 112 thus completing paths for the circulation of gas by convective action. The central portions of the structure are covered with a heavy coating of heat insulating material 122 to reduce radiation and heat loss. Sections 66 are introduced in each arm of tube 62 as shown and are of a nonheat-conducting material to prevent conduction of heat toward tubes 60. Passage of the gas through tubes 60 is intended to effect cooling of the gas to substantially the temperature of gas in conduit 112. If required, conventional cooling means, not shown, may obviously be provided to further lower the temperature of tubes 60 and thus increase the cooling effect on the gas returning through them to conduit 112.

Obviously, the arrangement of FIG. 3 operates in substantially the same manner as the arrangement of FIG. 2 but does not require an outer enclosing conduit 10 as is required by the arrangement of FIG. 2.

The laser or similar beam may of course follow the path 40 through the arrangement of FIG. 3.

Numerous and varied modifications and rearrangements of the specific structures described hereinabove can obviously be readily devised by those skilled in the art without departing from the spirit and scope of the principles of the invention. It is to be understood therefore that the above described structure while illustrative is not to be interpreted as limiting the invention.

What is claimed is:

1. A gaseous lens for focusing an ultrahigh frequency electromagnetic wave beam being transmitted through a gas filled enclosing conduit, said lens comprising a first tube of heat conductive material, the axis of the tube being substantially coincident with a portion of the beam path through the conduit, a second tube opening into and extending upwardly from the adjacent inner surface of said first tube at substantially the central portion of said first tube for a distance approximating but appreciably less than the distance to the inner wall of the enclosing conduit, means for heating said first tube thereby causing the gas in said first tube to become heated and to flow out of said first tube and into said second tube and, thereby, further causing a radial temperature gradient to be produced across the gas flowing through said first tube, and heat insulating material encasing both said tubes and said heating means.

2. The lens of claim 1 and means for adjusting the temperature of said first tube.

3. The lens of claim 1 and means for adjusting the temperature of said first and second tubes.

4. The lens according to claim 1 including means for conveying the gas emanating from the upper end of said second tube back to the outer ends of said first tube.

No references cited.

DAVID H. RUBIN, *Primary Examiner.*

JOHN K. CORBIN, *Examiner.*